(12) United States Patent
Lee

(10) Patent No.: US 6,603,632 B1
(45) Date of Patent: Aug. 5, 2003

(54) MAGNETIC WEAR DEBRIS COLLECTOR FOR AIR BEARING OF A SPINDLE MOTOR IN A HARD DISK DRIVE

(75) Inventor: Chen-Hsiung Lee, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/519,970

(22) Filed: Mar. 7, 2000

(51) Int. Cl.[7] .......................... G11B 33/14; G11B 17/02
(52) U.S. Cl. .................... 360/97.02; 360/99.08
(58) Field of Search ............................ 360/99.08, 98.07, 360/97.02, 97.03; 310/90, 90.5, 67 R

(56) References Cited

U.S. PATENT DOCUMENTS

| | | | |
|---|---|---|---|
| 5,127,744 A | 7/1992 | White et al. | |
| 5,587,617 A | * 12/1996 | Dunfield et al. | 310/90.5 |
| 5,675,200 A | * 10/1997 | Hayashi | 310/90 |
| 5,874,793 A | * 2/1999 | Kuwayama et al. | 310/90.5 |
| 5,926,342 A | 7/1999 | Nose | |
| 5,956,204 A | * 9/1999 | Dunfield et al. | 360/98.07 |
| 5,957,587 A | 9/1999 | Hong | |
| 5,969,448 A | 10/1999 | Liu et al. | |
| 5,969,903 A | * 10/1999 | Parsoneault et al. | 360/99.08 |
| 6,081,057 A | * 6/2000 | Tanaka et al. | 310/90 |
| 6,362,932 B1 | * 3/2002 | Bodmer et al. | 360/99.08 |

* cited by examiner

Primary Examiner—Craig A. Renner

(57) ABSTRACT

A method and apparatus for providing magnetic wear debris collection for an air bearing of a spindle motor in a hard disk drive is disclosed. A magnetic ring is provided near one end of the journal bearing forming an air bearing. In addition, the mating surface of the air bearing is paramagnetic or ferromagnetic material. The magnetic ring, acting as a debris collector, collects debris from the air bearing to prevent wear debris form reaching the head/disk interface, which can lead to a head crash. The journal bearing includes a mating surface. The mating surface may be of a paramagnetic or ferromagnetic material. A thrust bearing is provided to axially support the hub. The thrust bearing may be an oil bearing or an air bearing.

13 Claims, 4 Drawing Sheets

MAGNETIC WEAR DEBRIS COLLECTOR FOR AIR BEARING OF A SPINDLE MOTOR IN A HARD DISK DRIVE

BACKGROUND OF THE INVENTION

1. Field of the Invention.

This invention relates in general to spindle motors for use in magnetic disk storage systems, and more particularly to a method and apparatus for providing magnetic wear debris collection for an air bearing of a spindle motor in a hard disk drive.

2. Description of Related Art.

The storage capacity and general performance of hard disk drives have improved steadily over the last decade in response to the increasing demands of the computer industry. These developments have been mainly fueled by corresponding advances in the components of magnetic recording technology and in electronic sophistication and miniaturization. In particular, magnetic read/write recording heads and disks are capable of supporting areal data storage densities typically ten times greater than they could ten years ago. This is being achieved by higher track densities, higher linear flux transition densities and lower recording head flying heights.

Data storage systems, such as disk drives, commonly make use of rotating storage disks. The storage disks are commonly magnetic disks but could also be optical. In a typical magnetic disk drive, a magnetic disk rotates at high speed and a transducing head uses air pressure to "fly" over the top surface of the disk. The transducing head records information on the disk surface by impressing a magnetic field on the disk. Information is read back using the head by detecting magnetization of the disk surface. The magnetic disk surface is divided in a plurality of concentric tracks. By moving the transducing head radially across the surface of the disk, the transducing head can read information from or write information to different tracks of the magnetic disk.

The recording medium, i.e., magnetic disk, holds information encoded in the form of magnetic transitions. The information capacity, or areal density, of the medium is determined by the transducer's ability to sense and write distinguishable transitions. An important factor affecting areal density is the distance between the transducer and the recording surface, referred to as the fly height. It is desirable to fly the transducer very close to the medium to enhance transition detection. Some fly height stability is achieved with proper suspension loading and by shaping the air bearing slider surface (ABS) for desirable aerodynamic characteristics.

Spindle motors are commonly used to rotate magnetic disks at high speeds. Frequently, conventional spindle motors comprise small electric motors equipped with standard ball bearings. However, electric motors having ball bearings are known to experience problems such as runout or vibration that can prevent information from being accessed from disks rotated by the motors. This is especially true as advancements in data storage technology have increased magnetic disk storage densities.

The point is now being reached, however, where further advances are likely to be impeded by mechanical constraints. In particular, limitations will result from the spindle hub holding the stack of disks on account of the properties of the ball bearing assemblies used for rotational support. Random vibrations in both axial and radial axes ultimately lead to limitations in positioning accuracies and signal-to-noise ratios with consequences for storage capacities. The radial accuracy directly limits the number of concentric tracks on a disk on which data can be stored and reliably retrieved.

To overcome the problems associated with ball bearing electric motors, some disk drive systems now make use of electric motors having fluid hydrodynamic bearings. Bearings of this type are shown in U.S. Patent Nos. 5,427,546 to Hensel, 5,516,212 to Titcomb and 5,707,154 to Ichiyama.

An exemplary hydrodynamic bearing typically includes a stationary shaft on which is mounted a rotary hub to which magnetic disks can be secured. There is no direct contact between the rotating hub and the shaft. Instead, a lubricating fluid such as air or oil forms a hydrodynamic bearing between the shaft and the rotary hub. Hydrodynamic pressure or pumping is frequently provided by a pattern of grooves, commonly in a herringbone configuration, defined either by the exterior surface of the shaft or the interior surface of the rotary hub. During rotation of the hub, the pattern of grooves provides sufficient hydrodynamic pressure to cause the lubricating fluid to act as a bearing between the shaft and the rotary hub. Frequently, capillary seals are used to retain the bearing fluid between the shaft and the rotary hub. Still, oil bearings have some disadvantages. For example, oil bearings consume more power than ball bearings or air bearings. Furthermore, when oil bearings are used in the journal bearing environment, oil leakage can be problematic.

When used in association with spindle motors, air bearings provide numerous advantages. For example, air bearings are more efficient and consume less power than either ball bearings or oil bearings. Also, air bearings are quiet and have excellent run out characteristics. Air bearings also have disadvantages. For example, when air bearings are used in disk drive spindle motors, it can be difficult or expensive to simultaneously provide both thrust (e.g. axial) and journal (e.g. radial) bearing support. Also, sliding friction associated with thrust operations during motor start-up and shutdown can create wear debris that reduces the efficiency of the motor. Additionally, air bearings often require more space than either ball or oil bearings thereby providing less space for the motor. Finally, air bearings are typically not effective for low rotational speed applications.

In the future, spindle motor disk rotation speeds will steadily increase. As disk rotation speeds increase, the problems associated with standard oil bearings, air bearings and ball bearings will become magnified. Increased disk recording density is another trend in the industry. The combination of increased disk rotation speeds and increased recording densities will require disk drives to operate with improved run out characteristics.

Still, because of the associated advantages discussed above, air bearings will be used more frequently as the rotating speed is increased. One of the more serious problems with air bearings is the problem of accumulated debris. It is necessary that the bearing lubricant, i.e., air, be maintained with a minimum amount of loose particles. Particles in the lubricant may originate from ambient environment or may be generated by contact between moving surfaces during operation. Generally, wear particles are generated in the bearing areas during motor start and stop. Such particles exhibit relatively jagged edges. Wear particles tend to generate when two members of differing hardnesses contact each other. Since bearings typically have a clearance of approximately 5 to 10 microns, particles in the lubricant may act as abrasive ingredients and cause accelerated wear of groove patterns in the bearing and eventually failure of the bearing.

Prior art approaches for providing particle traps in hydrodynamic bearings, such as oil bearings, have placed such traps in the recirculation port and at a location far away from the journal and thrust bearings. In addition, such particle traps have relied on global lubricant recirculation to move particles into the trap. However, these approaches are neither suited nor effective for controlling debris accumulation in air bearings.

It can be seen then that there is a need for a method and apparatus for providing magnetic wear debris collection for an air bearing of a spindle motor in a hard disk drive.

SUMMARY OF THE INVENTION

To overcome the limitations in the prior art described above, and to overcome other limitations that will become apparent upon reading and understanding the present specification, the present invention discloses a method and apparatus for providing magnetic wear debris collection for an air bearing of a spindle motor in a hard disk drive.

The present invention solves the above-described problems by providing a magnetic ring near one end of the journal bearing of a spindle air bearing. In addition, the mating surface of the air bearing is paramagnetic or ferromagnetic material.

A system in accordance with the principles of the present invention includes an air bearing debris collector. The air bearing debris collector includes a magnetic ring positioned in an air gap near an air journal bearing, the magnetic ring collecting debris from the air journal bearing to prevent wear debris from reaching the head/disk interface to prevent a head crash.

Other embodiments of a system in accordance with the principles of the invention may include alternative or optional additional aspects. One such aspect of the present invention is that the air journal bearing includes a mating surface, the mating surface of the air journal bearing comprises a paramagnetic material.

Another aspect of the present invention is that the air journal bearing includes a mating surface, the mating surface of the air journal bearing comprises a ferromagnetic material.

Another embodiment of the present invention includes a spindle motor. The spindle motor includes a hub having at least one magnetic recording disk attached thereto, a stator for selectively rotating the hub and at least one magnetic recording disk attached to the hub, a base for supporting the hub and stator, a journal bearing, coupled to the hub, for radially supporting the hub, the journal bearing being an air bearing, a thrust bearing, coupled to the hub, for providing axial support to the hub and a magnetic ring, disposed proximate the journal bearing, for collecting wear debris generated by the air bearing.

Another aspect of the present invention is that the journal bearing includes a mating surface, the mating surface of the journal bearing comprising a paramagnetic material.

Another aspect of the present invention is that the journal bearing includes a mating surface, the mating surface of the journal bearing comprising a ferromagnetic material.

Another aspect of the present invention is that the thrust bearing comprises an air bearing.

Another aspect of the present invention is that the thrust bearing comprises an oil bearing.

Another embodiment of the present invention includes a disk drive. The disk drive includes at least one disk for recording and reading data thereon, a motor, coupled to the at least one disk, for rotating the at least one disk, at least one head disposed proximate the at least one disk for writing and reading data to and from the at least one disk and an actuator arm assembly, coupled to the at least one head, for moving the at least one head relative to the at least one disk; wherein the motor further includes a hub coupled to the at least one disk, a stator for selectively rotating the hub and at least one disk attached to the hub, a base for supporting the hub and stator, a journal bearing, coupled to the hub, for radially supporting the hub, the journal bearing being an air bearing, a thrust bearing, coupled to the hub, for providing axial support to the hub and a magnetic ring, disposed proximate the journal bearing, for collecting wear debris generated by the air bearing.

Another embodiment of the present invention includes a method for providing magnetic wear debris collection for an air bearing of a spindle motor in a hard disk drive. The method includes providing a spindle motor comprising a hub, providing an air bearing for a journal bearing radially supporting the hub, positioning a magnetic ring in a position proximate to the air bearing and as the motor is activated to spin the spindle and disk, accumulating debris at the magnetic ring.

These and various other advantages and features of novelty, which characterize the invention, are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings that form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for providing magnetic wear debris collection for an air bearing of a spindle motor in a hard disk drive. The present invention provides a magnetic ring near one end of the journal bearing of a spindle air bearing. The magnetic ring prevents wear debris migration to the head/disk interface. The mating surface of the air bearing is paramagnetic or ferromagnetic material.

Figure 1:
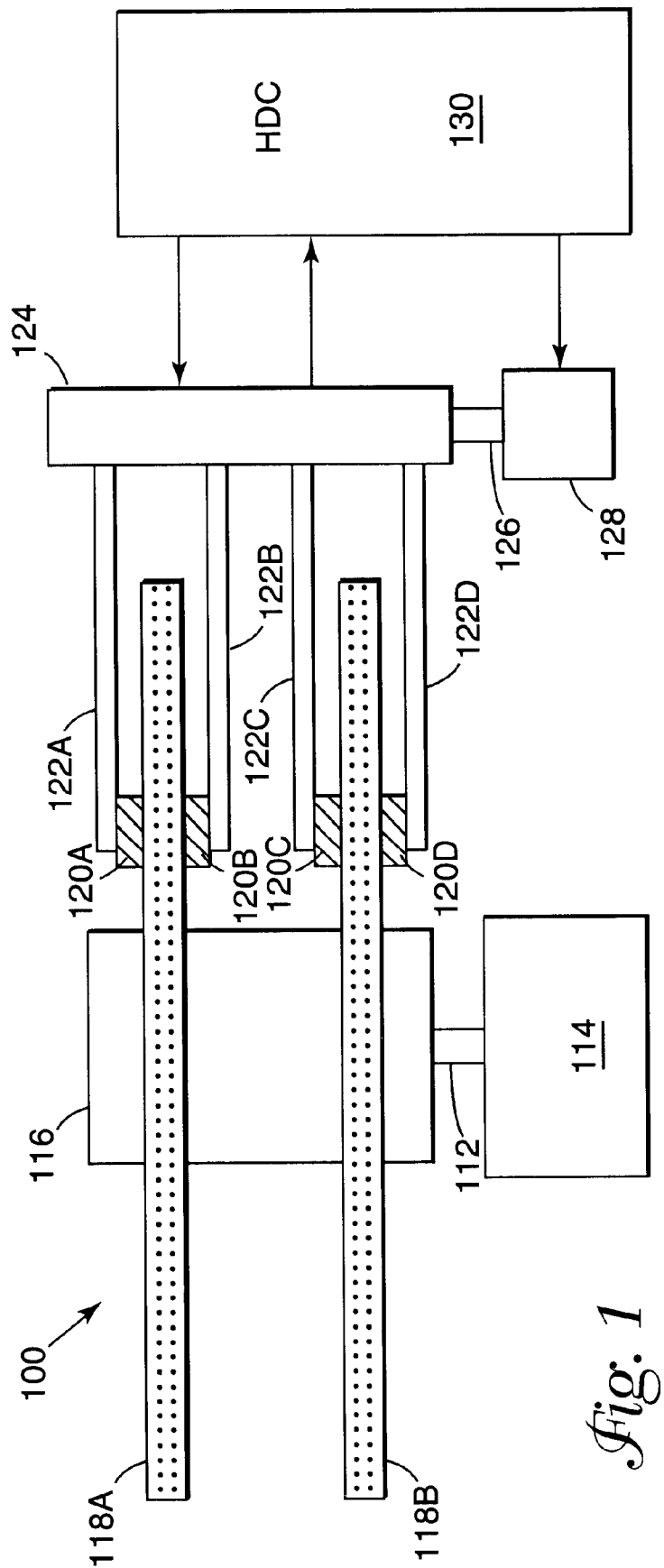
FIG. 1 illustrates a hard disk drive (HDD) including disks according to the present invention.

FIG. 1 illustrates a hard disk drive (HDD) 100 including disks 118A, 118B according to the present invention. The HDD 100 includes a disk 118 and a hard disk controller (hereinafter referred to as HDC) 130. The disk part has a motor 114 for rotating a shaft 112 at a high speed. A cylindrical support 116 is attached to the shaft 112 so that their axes are in coincidence. One or more information recording disks 118A and 118B are mounted to support 116. Magnetic heads 120A, 120B, 120C and 120D are respectively provided to face the disk surface, and these magnetic heads are supported from an actuator 124 by access arms 122A, 122B, 122C, and 122D, respectively. The individual magnetic heads 120A to 120D receive the drive force transmitted from an actuator drive device 128 by a shaft 126 and rotates about the shaft 126 as the axis of rotation, and fly over the disk 118 to a predetermined position.

Figure 2:
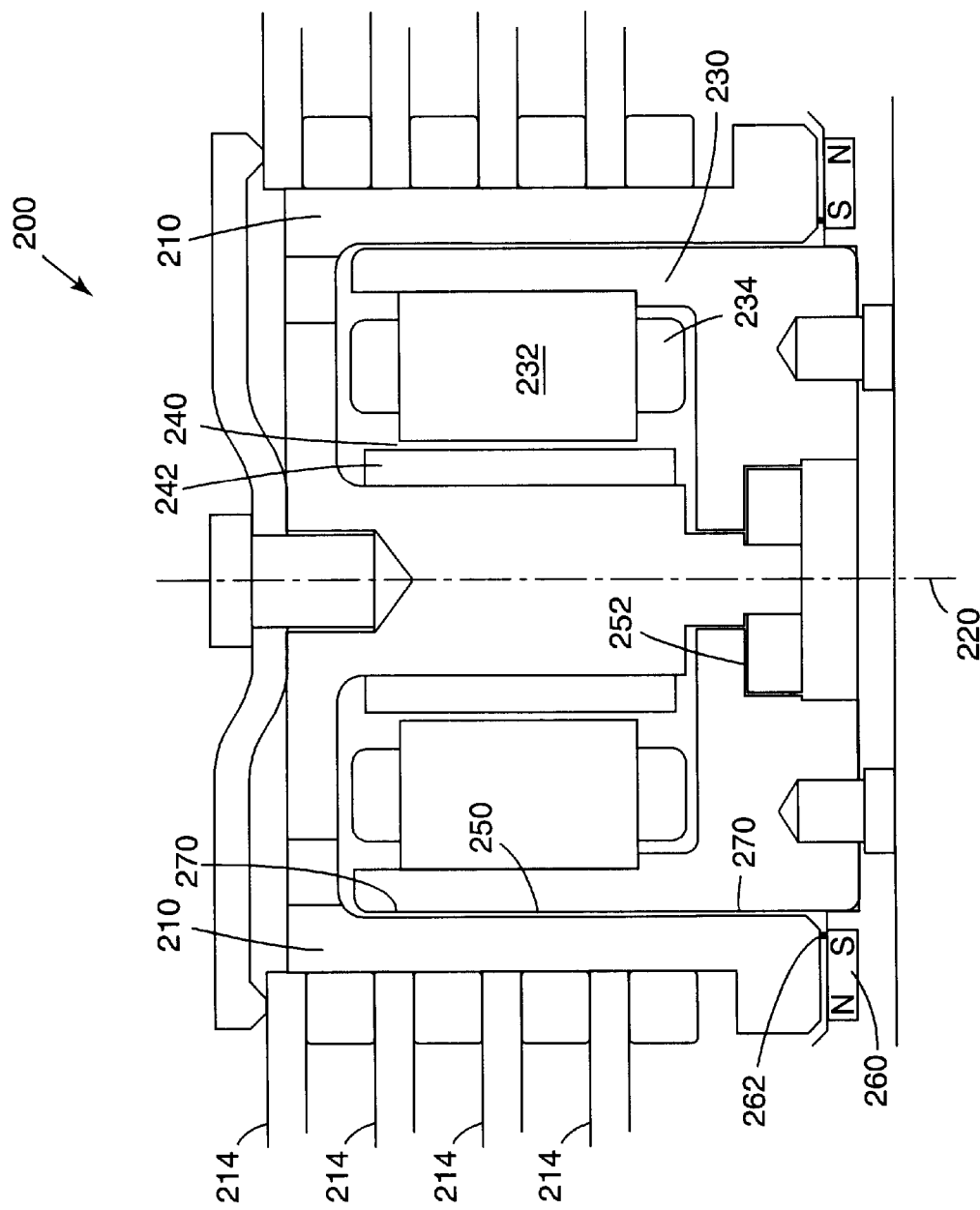
FIG. 2 illustrates a more detailed view of the motor according to the present invention.

FIG. 2 illustrates a more detailed view of the motor 200 according to the present invention. In FIG. 2, the motor 200 includes a rotatable hub 210 having a plurality of disks 214 mounted thereto. The hub 210 is mounted for rotation about an axis 220. A stator 230 is mounted inside the hub 210. The stator 230 includes a core 232 and armature windings 234. An air gap 240 is formed between the core 232 and the surface of magnetic poles 242. Typically, the armature windings are led out of the hub 210 and connected to a power supply of the disk drive via a motor control circuit (which may be hard disk controller 130 as shown in FIG. 1) for controlling the rotation of the hub 210 and associated disk 214.

According to the present invention, a journal bearing 250 provides an air bearing for radially supporting the hub 21 0. A thrust bearing 252 provides axial support of the hub and may be an air bearing or an oil bearing. The mating surface 270 of the air bearing 250 comprises a paramagnetic or ferromagnetic material. A magnetic ring 260 is positioned near one end of the air bearing 250. The magnetic ring 260 collects wear debris 262 generated by the air bearing 250.

Figure 3:
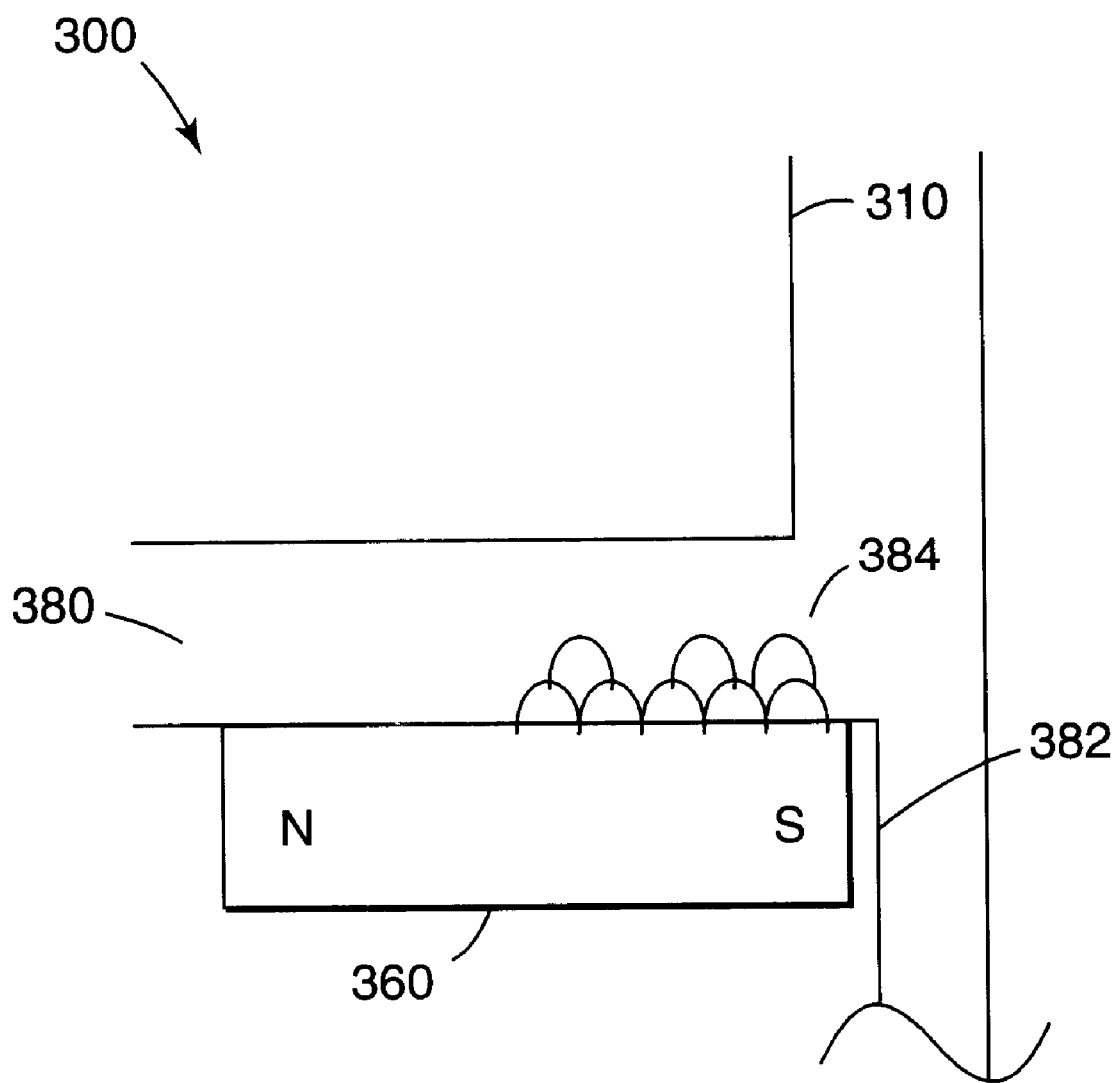
FIG. 3 illustrates a close-up view of the motor structure according to the present invention.

FIG. 3 illustrates a close-up view of the motor structure 300 according to the present invention. In FIG. 3, a gap 380 exists between the hub 310 and the base 382 having the magnetic ring 360 attached thereto. Thus, the debris 384 accumulates at the magnetic ring 360 thereby preventing wear debris from reaching the head/disk interface where the debris 384 can cause a head crash.

Figure 4:
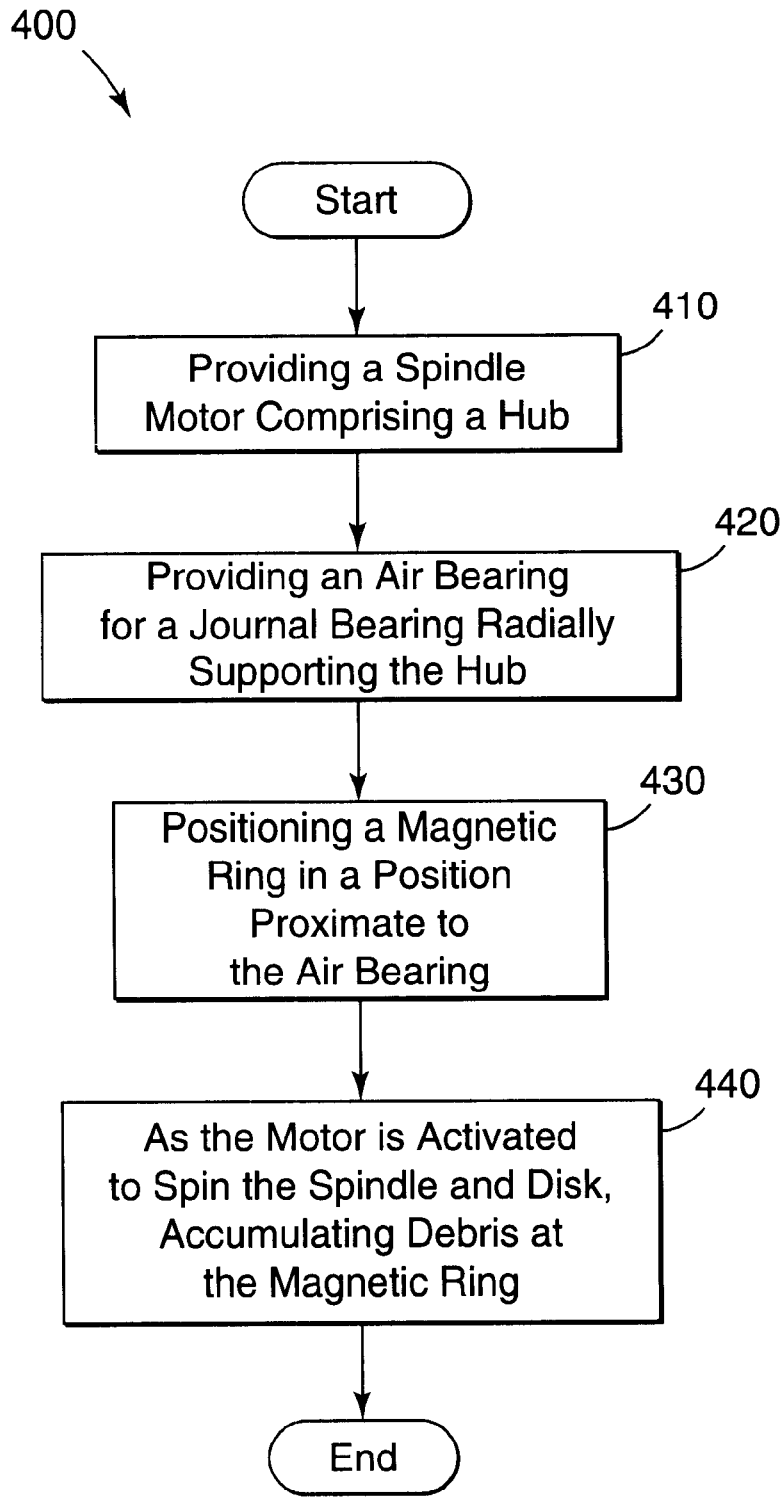
FIG. 4 illustrates a flow chart of the method for providing magnetic wear debris collection for an air bearing of a spindle motor in a hard disk drive according to the present invention.

FIG. 4 illustrates a flow chart 400 of the method for providing magnetic wear debris collection for an air bearing of a spindle motor in a hard disk drive according to the present invention. A spindle motor comprising a hub is provided 410. An air bearing is provided for the journal bearing 420. A magnetic ring is positioned in a position relative to the air bearing 430. As the motor is activated to spin the spindle and disk, debris accumulates at the magnetic ring 440.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An air bearing debris collector comprising a magnetic debris collection ring disposed on a surface of a base, juxtaposed to an outermost circumference of a disk drive spindle motor hub, and forming a plane orthogonal to a spindle shaft, the magnetic debris collection ring further being disposed at an opening of an air journal bearing, the magnetic debris collection ring collecting wear debris flowing from the opening.

2. The air bearing debris collector of claim 1 wherein the air journal bearing includes a mating surface, the mating surface of the air journal bearing comprises a paramagnetic material.

3. The air bearing debris collector of claim 1 wherein the air journal bearing includes a mating surface, the mating surface of the air journal bearing comprises a ferromagnetic material.

4. A spindle motor, comprising:

a hub having at least one magnetic recording disk attached thereto;

a stator for selectively rotating the hub and at least one magnetic recording disk attached to the hub;

a base for supporting the hub and stator;

a journal bearing, coupled to the hub, for radially supporting the hub, the journal bearing being an air bearing;

a thrust bearing, coupled to the hub, for providing axial support to the hub; and a magnetic ring, disposed in the base juxtaposed to an outermost circumference of the hub and in a gap proximate the journal bearing, for collecting wear debris generated by the air bearing.

5. The spindle motor of claim 4 wherein the journal bearing includes a mating surface, the mating surface of the journal bearing comprising a paramagnetic material.

6. The spindle motor of claim 4 wherein the journal bearing includes a mating surface, the mating surface of the journal bearing comprising a ferromagnetic material.

7. The spindle motor of claim 4 wherein the thrust bearing comprises an air bearing.

8. The spindle motor of claim 4 wherein the thrust bearing comprises an oil bearing.

9. A disk drive, comprising:

at least one disk for recording and reading data thereon;

a motor, coupled to the at least one disk, for rotating the at least one disk;

at least one head disposed proximate the at least one disk for writing and reading data to and from the at least one disk, and an actuator arm assembly, coupled to the at least one head, for moving the at least one head relative to the at least one disk;

wherein the motor further comprises:

a hub coupled to the at least one disk;

a stator for selectively rotating the hub and at least one disk attached to the hub;

a base for supporting the hub and stator;

a journal bearing, coupled to the hub, for radially supporting the hub, the journal bearing being an air bearing;

a thrust bearing, coupled to the hub, for providing axial support to the hub; and a magnetic ring, disposed in the base juxtaposed to an outermost circumference of the hub and in a gap proximate the journal bearing, for collecting wear debris generated by the air bearing.

10. The disk drive of claim 9 wherein the journal bearing includes a mating surface, the mating surface of the journal bearing comprising a paramagnetic material.

11. The disk drive of claim 9 wherein the journal bearing includes a mating surface, the mating surface of the journal bearing comprising a ferromagnetic material.

12. The disk drive of claim 9 wherein the thrust bearing comprises an air bearing.

13. The disk drive of claim 9 wherein the thrust bearing comprises an oil bearing.

* * * * *

UNITED STATES PATENT AND TRADEMARK OFFICE
CERTIFICATE OF CORRECTION

PATENT NO.   : 6,603,632 B1
DATED        : August 5, 2003
INVENTOR(S)  : Lee

Page 1 of 1

It is certified that error appears in the above-identified patent and that said Letters Patent is hereby corrected as shown below:

Column 2,
Line 25, "Still, oil bearings...." should be a new paragraph.

Column 5,
Line 26, "21 0" should read -- 210 --.

Signed and Sealed this

Sixteenth Day of December, 2003

JAMES E. ROGAN
*Director of the United States Patent and Trademark Office*